Nov. 28, 1961     H. C. ABRAMS     3,010,435
CONTROL CYLINDER
Filed April 17, 1959     2 Sheets-Sheet 1
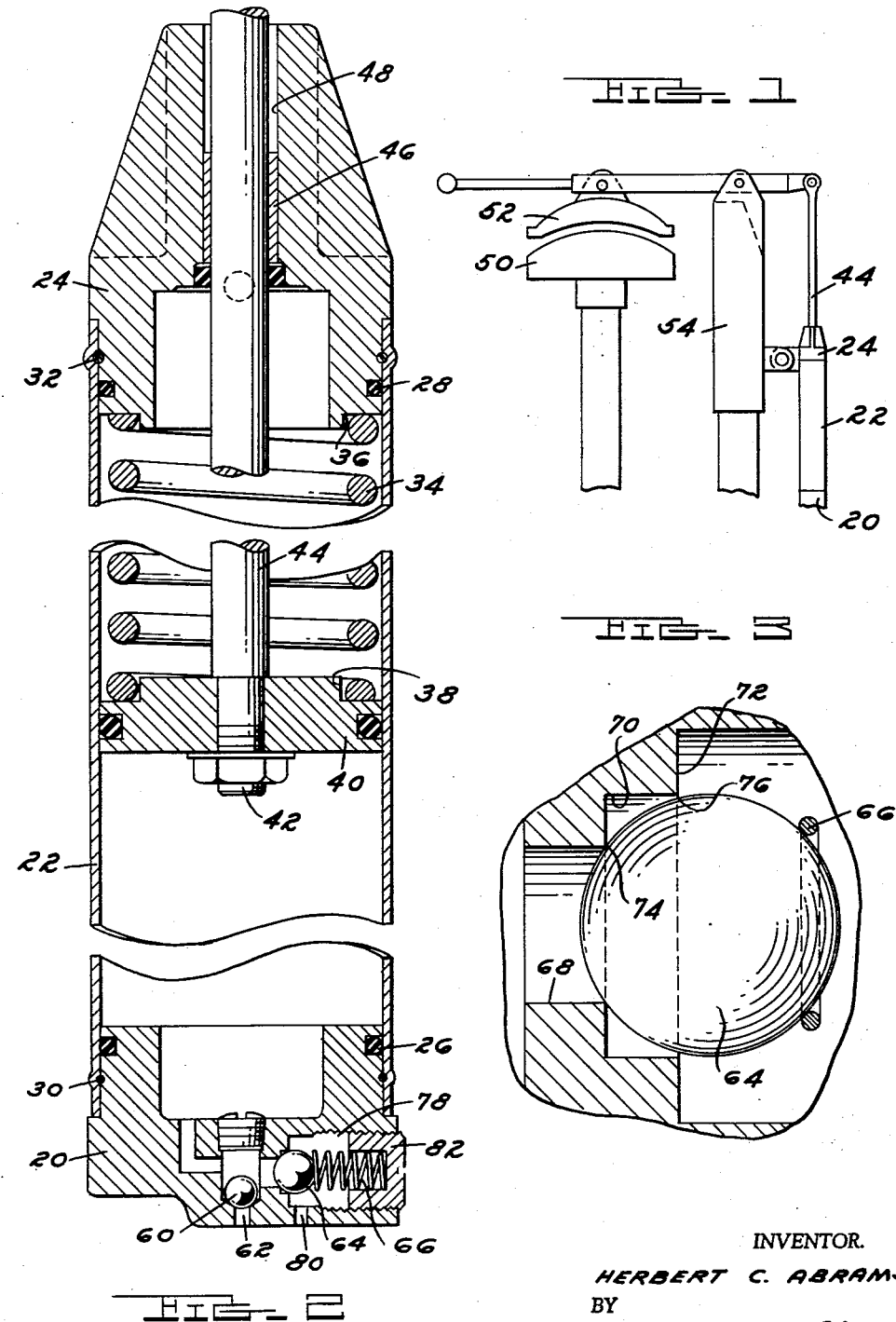
INVENTOR.
HERBERT C. ABRAMS
BY
Barnes, Kisselle, Raisch & Choate
ATTORNEYS

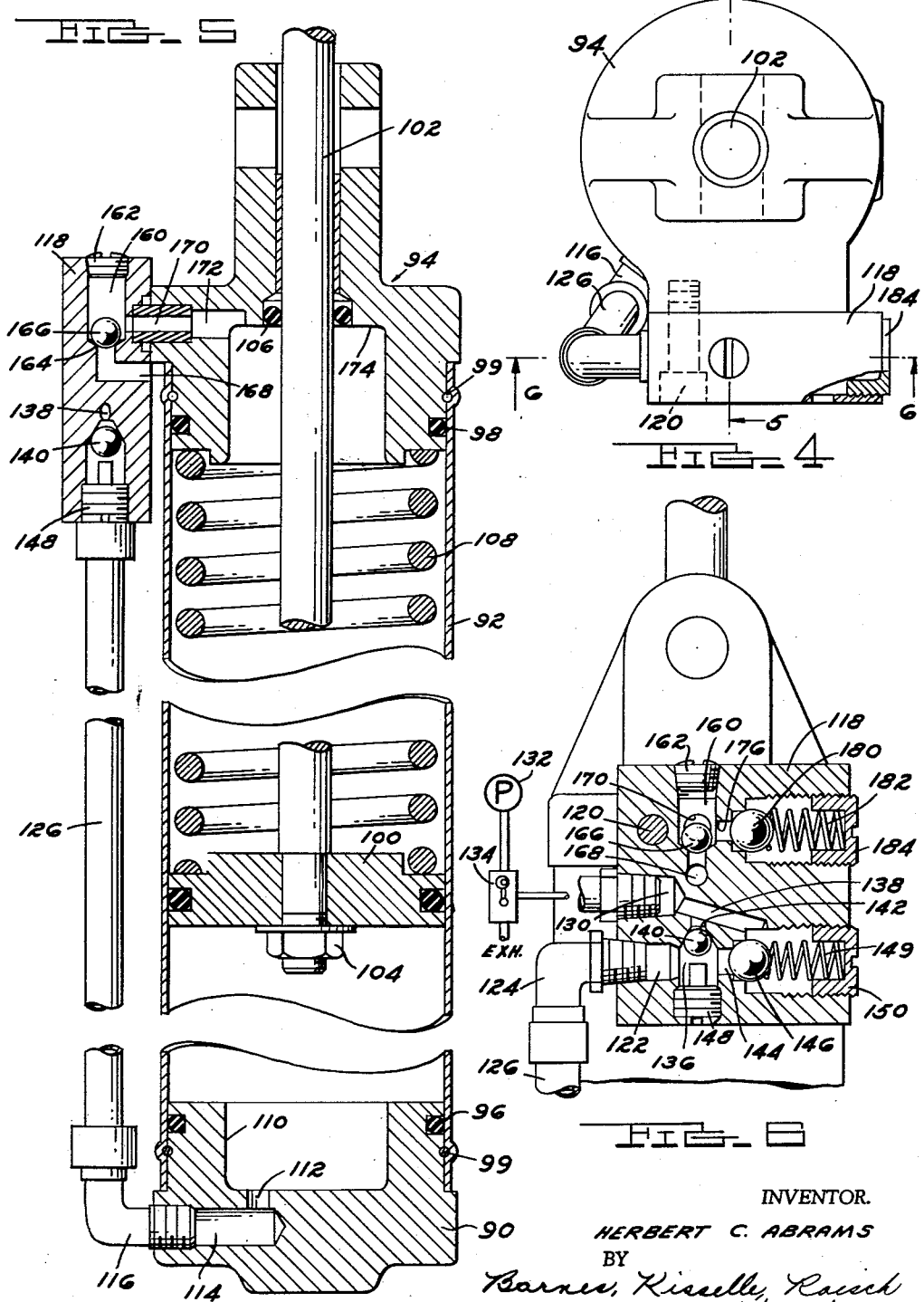

United States Patent Office 3,010,435
Patented Nov. 28, 1961

3,010,435
CONTROL CYLINDER
Herbert C. Abrams, 8909 Hubbell, Detroit 28, Mich.
Filed Apr. 17, 1959, Ser. No. 807,140
7 Claims. (Cl. 121—38)

This invention relates to a control cylinder for moving parts and more particularly to a fluid operated cylinder which may be used on pressing machines, storm and screen doors, and air operated tools.

For example, in a pressing machine there is a swinging arm which is counter-balanced and spring-loaded to rest in a definite position. The arm is moved into the working position either by hand or by a power cylinder and then is allowed to return to the rest position.

In the past it has been common to control these devices with an oil-filled shock absorber cylinder, but this is objectionable because of leakage or change in the oil consistency due to temperature or sludge. Other attempts to use an air-filled shock absorber have failed because of the bouncy or springy action and also because the needle valve usually used to control the air flow needed constant cleaning and adjustment.

It is an object of the present invention to provide a composite air cylinder and shock absorber with valves which control the air into and out of the cylinder in a manner to prevent the bouncy or springy action commonly found.

It is also an object to provide a control valve arrangement in such an air cylinder in which adjustments are not critical and in which there is no problem of oil changes as there would be in a liquid dash pot device.

Other objects and features of the invention relating to details of construction will be apparent in the following description and claims.

Drawings accompany the disclosure and the various views thereof may be briefly described as:

FIGURE 1, a diagrammatic view of a pneumatic press in which the cylinder can be installed.

FIGURE 2, a vertical section of a control cylinder and piston.

FIGURE 3, an enlarged view of a stepped seat for a ball check control.

FIGURE 4, a top view of a composite power and control cylinder.

FIGURE 5, a sectional view on line 5—5 of FIGURE 4.

FIGURE 6, a partial section on line 6—6 of FIGURE 4.

Referring to the drawings:

As shown in FIGURE 1, a control cylinder is composed of a base unit 20, a shell unit 22, and a head unit 24. These elements are telescoped together and sealed by O-rings 26 and 28, the parts being held in assembled relation by split rings 30 and 32 at the bottom and top respectively. Within the cylinder a spring 34 is seated in an annular seat 36 at the head 24 and in an annular seat 38 in a piston 40, which, in turn, is mounted on the small end 42 of a rod 44 projecting out through a slide seal 46 in an opening 48 in the head.

The device is shown in installation in FIGURE 1 where a clothes pressing machine having a bed 50 and a top press unit 52 has a fulcrum 54 and a control cylinder 22 as shown in FIGURE 2. It will be noted that the spring action of spring 34 would tend to raise the press unit 52 which may be brought down either by hand or by pneumatic or hydraulic pressure.

The details of the control valve in the control cylinder assembly include a unidirectional ball check 60 in an atmospheric vent valve seat 62. This ball permits entry of air into the cylinder when the piston 40 is moving up. An outlet valve ball check 64, held on seat by a spring 66, is shown in detail in FIGURE 3 where it will be seen that there is a stepped or graduated seat starting with a main or primary opening 68, stepped to a concentric, axially-spaced second opening 70, stepped to a third opening 72, leaving spaced, concentric intermediate corner seats 74 and 76 with an intermediate chamber 70. The chamber 78 in the enlarged bore is open to atmosphere through a passage 80 on the bottom of the cylinder base 20. Spring 66 is held in place by an adjustable screw plug 82 having a suitable seat for the spring.

In the operation of the device shown in FIGURE 2, it will be understood that the top of the cylinder is suitably vented and the bottom part of the cylinder in the base 20 is sealed with a stainless steel ball 64 which has a diameter equal to or very close to the diameter of the recess 70. The ball contacts and seals the primary seat 74, the center line of the ball being just outside of the seat 76 allowing a small clearance around it. The spring 66 is adjusted against the ball so that the desired air pressure acting against the smaller diameter at seat 74 develops a force that just counter-balances the force of spring 34. This allows air to bleed past the ball 64 upon the return stroke, for example, of the press element 52.

When the volume of air bleeding past the ball at seat 74 exceeds that which can bleed past the larger seat 76 without developing additional pressure in the intermediate passage 70, the effective force will suddenly be that of the larger diameter seal at seat 76, a force greater than that for which the spring 66 was adjusted. As a result, the ball will pop to a new open position allowing a large amount of air to escape rapidly.

The action of the valve is to create a cushioning force which builds up as the piston nears the end of its stroke. When the valve unloads, it allows a considerable volume of air to bleed out; but in contrast to the action of a needle valve, the air is removed so that the inherent trapped energy does not cause a rebound action on the piston.

Referring to FIGURES 4, 5 and 6, a composite power and control cylinder is shown having telescoping parts including a base 90, a cylindrical intermediate portion 92, and a cylinder head 94. The parts are sealed by O-rings 96 and 98 and held together by lock rings 99. A piston 100 on a piston rod 102 is located in the cylinder held on the rod by a nut 104, the rod being suitably sealed by a member 106 in the head. A spring 108 urges the piston downwardly as viewed in FIGURE 5. A recess 110 in the base 90 opens to a passage 112 leading to a bore 114 connected to an elbow 116.

On one side of the head 94 is a supplemental block housing 118 bolted to the head at 120. This block housing has a side passage 122 with an elbow 124 fitted therein connected to a conduit 126 which is threadedly connected to the elbow 116. A side inlet 130 for the block housing 118 provides for a source of pressure from a pump 132 and a valve 134. Passage 122 is connected to passage 130 through a port 136 and a port 138 connected by a ball 140 in a seat 142 for unidirectional flow from passage 138 to passage 136. Port 136 has a port 144 on the other side from the entrance port 142. In this port 144, a double valve seat is provided for a ball 146, the valve seat being the same as shown in enlarged section FIGURE 3.

Valve 134 can connect passage 130 to atmosphere and it will be seen that pressure from the pump can be directed past valve 140 to conduit 126 leading to the bottom of the cylinder. However, return air from the bottom of the cylinder will close valve 140 and will necessarily have to bleed past valve 146 into port 138 and through valve 134 to exhaust. Passage 136 is closed by a plug 148 having a suitable stop for ball 140. The position of plug 148 adjusts the ball 140 relative to port 142 to form a control or needle valve action restricting the flow and thus controlling the speed of the piston on the upstroke which would be the downstroke of the head, for example. Ball 146 is backed by a spring 149 adjustable by the threaded plug 150.

In the top of the block 118 a bore 160, closed by a plug 162, has a seat 164 with a ball 166 located therein, this bore being connected with a passage 168 leading to atmosphere. Passage 160 is also connected through a thimble passage 170 to a cross passage 172 connected to a recess 174 in the top of the head 94. Bore 160 is also connected through a passage 176 leading to a double valve seat, as shown in enlarged section in FIGURE 3, controlled by a ball 180, said ball being backed by a spring 182 and an adjustable plug 184.

With these passages the upper side of the piston 100 is vented through passage 168, ball 166, and passages 170 and 172 when the piston is on its downward travel. On the upward travel of the piston air leaving the cylinder 92 passes through passages 172, 170, 160 and 176 to ball 180 which is adjusted at its first and smallest seat to balance the pressure utilized to move the piston upwardly against the spring.

In the operation of the device it will be seen that the composite cylinder has control for air into and out of the cylinder and thus provides a power cylinder which serves also as a shock absorber. When applied to a press, the cylinder 92 would be substituted for the cylinder 22, shown in FIGURE 1, and power from the control valve could be used to lower the press, the spring providing for the return.

As shown in FIGURE 3, it is preferable that the diameter of the seat 76 be substantially equal to the diameter of the ball 64, the seats being concentric, of course, so that there is a slight air gap between the seat 76 and the ball when seat 74 is closed. Thus air bleeding past the seat 74 can readily escape through the passage around the ball at seat 76 to a certain degree. Leakage of a quantity which will build up pressure in the passage 70 will then pop the valve off the seat completely allowing a much freer flow. If the ball was slightly larger than the passage 70 and the diameter of the seat 76, then the axial distance between the seat 76 and the seat 74 might be shortened slightly to provide also for the clearance mentioned.

The action of the check valves with the double seat arrangement results from the physical laws defined in Boyle's law: $P_1V_1=P_2V_2=$ constant, and Newton's law: $F=ma$. The action of the shock absorber is to provide force to decelerate the moving elements such as the head of a pressing machine. Pressure builds up in the cylinder chamber between the piston and the end of the cylinder toward which it is traveling because of the Boyle's law relationship. Solving for $P_2$, we find that $$P_2 = \frac{P_1 V_1}{V_2}$$

Assuming that $V_2$ is decreasing toward 0, the increasing pressure is approaching infinity.

Multiplying the increasing pressure by the piston area where force equals the area times the pressure, there is a force on the piston to oppose the inertia of the parts and the force of the incoming air pressure times the piston area. The pressure drop across the inlet needle valve 140 during the movement of the piston controls the speed as well as the magnitude of the force to be counteracted.

The check valve removes the spring cushioning rebound by allowing the air pressure to build to the amount needed to provide the deceleration force just before the end of the stroke and then the unloading or popping action prevents a return of the stored energy in the compressed air. The timing, of course, is provided by regulating the sizes of the piston in relation to the length of the stroke and the energy of the parts to assure the maximum pressure occurring just prior to the end of the stroke.

I claim:
1. A pneumatic control cylinder comprising a means forming a cylinder, a piston in said cylinder, a unidirectional entrance passage on one side of said cylinder for fluid to enter said cylinder freely, a unidirectional exit passage for said cylinder, a valve element in said exit passage, said exit passage being unrestricted and having a seat means composed of a primary seat for contacting said valve element, and a secondary seat spaced from said primary seat dimensioned to provide clearance around said valve element when seated in said primary seat wherein cushioning pressure developed at the end of a stroke is relieved to prevent bounce.

2. A pneumatic control cylinder comprising a cylindrical sleeve, a base telescoped relative to said sleeve at one end, a head telescoped relative to said sleeve at the other end, means for sealing said sleeve relative to said base and said head, a piston in said sleeve having a piston rod extending through said head, and control passages for said piston in said base comprising a unidirectional inlet and a unidirectional outlet, said outlet comprising an unrestricted passage having a pair of concentric axially spaced graduated seats therein, and a valve means in said passage adjustably biased against said seats, said valve means being dimensioned to lie slightly spaced from the larger of said seats when in contact with the smaller of said seats.

3. A combination control and power cylinder for air operation comprising a closed end cylinder having a head portion telescopically associated therewith and sealed in relation thereto, a piston in said cylinder having a rod passing through said head, and a plurality of passages in said head, each comprising a branched passage having a unidirectional flow means therein permitting flow in different directions in said branches toward and away from the interior of the cylinder at the respective ends thereof, the unidirectional passages permitting flow away from said cylinder ends being unrestricted and having a double seat therein, said seats being graduated to provide a first and second seat and being spaced axially and being concentric relative to each other, and resiliently biased valve means adapted, when in connection with said first seat, to clear said second seat.

4. A combination control and power cylinder for air operation comprising a closed end cylinder having a head end and a base end, a piston in said cylinder having a piston rod passing through one of said ends, each of said ends having a passage communicating with said cylinder, unidirectional ingress branch passages communicating with said passages in said ends for connecting said cylinder on opposite sides of the piston to ingress of air, unidirectional unrestricted escape branch passages communicating with said passages in said ends for metering outward flow from the cylinder on the respective ends of said piston, and a valve in each of said escape branch passages for regulating flow therethrough to provide a two-stage escapement comprising a pair of concentric valve seats axially spaced with graduated diameters, and a resiliently biased valve member positioned to control flow through said seats, said member being shaped to clear the larger seat to a predetermined degree when in contact with the smaller of said seats.

5. A combination pneumatic control and power cylinder comprising a cylindrical sleeve, a head-end on each end of said sleeve in sealed telescopic fit with said sleeve, each head end having a passage for ingress and egress of air and one of said ends having a piston rod bore, a piston in said sleeve having a rod slidable in said bore, and a control block pneumatically connected with each of said end passages, said block having unidirectional ingress passages connected to said end passages, and said block having unidirectional control passages for metering fluid from the respective sides of said piston in said sleeve, each of said control passages comprising a two-stage valve seat having axially spaced, concentric graduated seats with an intermediate chamber, a resiliently biased valve in each of said passages having a portion to close the smaller of said seats while clearing the larger of said seats to allow predetermined flow therethrough, said valve being responsive to increased pressure in said intermediate chamber resulting from greater flow through said smaller seat to cause unrestricted opening of both of said seats.

6. A pneumatic control cylinder for use in counterbalancing the weight and energy of a moving part which comprises a cylinder, a piston in said cylinder having a piston rod extending outwardly from one end of the cylinder, passage means at each of said cylinder to permit the ingress and egress of fluid to said cylinder, and means pneumatically associated with at least one of said passage means to create a resistance to egress of flow from the end of said cylinders, said means being responsive to increased pressure to cause gradual bleeding of said pressure to a predetermined point and then an instantaneous release of said pressure to deplete the fluid in the end of said cylinder toward which the piston is traveling to prevent bounce of the piston.

7. A pneumatic control device for regulating the deceleration of a moving part such as a head of a pressing machine which comprises, a piston-cylinder combination, a rod on said piston, one of the elements of said piston cylinder combination being associated with said head to move with the head, unrestricted passage means in one end of said cylinder for controlling the egress of air therefrom, and a valve in said passage means resiliently biased against the egress of fluid from said cylinder, said valve being shaped to permit slight bleeding of fluid as the piston approaches the end of the cylinder with which the valve is associated, said valve being responsive to a predetermined build-up of cushioning pressure in said end of said cylinder to instantaneously release said pressure and deplete the fluid from said end of said cylinder to prevent energy storage in said end of said cylinder.

References Cited in the file of this patent

UNITED STATES PATENTS

| | | |
|---|---|---|
| 1,305,964 | Dickson | June 3, 1919 |
| 2,232,514 | Day | Feb. 18, 1941 |
| 2,587,182 | Livers | Feb. 26, 1952 |
| 2,704,549 | Strnad | Mar. 22, 1955 |
| 2,786,452 | Tucker | Mar. 26, 1957 |
| 2,789,510 | Meynig | Apr. 23, 1957 |
| 2,897,785 | Ortman | Aug. 4, 1959 |